United States Patent [19]
Eiermann et al.

[11] Patent Number: 5,207,765
[45] Date of Patent: May 4, 1993

[54] SENSOR FOR THERMAL MASS FLOWMETERS

[76] Inventors: Kurt Eiermann, Friedhofstrasse 26, D-6102 Pfungstadt 2; Dieter Link, August-Bebel-Strasse 1, 6450 Hanau 11; Martin Hohenstatt, Unter den Weingaerten 9, 6451 Hammersbach; Reiner Goebel, Schanzenstrasse 7, D-6450 Hanau 11; Juergen Schrode, Urnenstrasse 11, D-6451 Hammersbach 1; Andreas Gabel, Eifelstrasse 23, D-6095 Ginsheim 2; Andreas Hoehler, Gruenaustrasse 5, D-6450 Hanau 9, all of Fed. Rep. of Germany

[21] Appl. No.: 746,666

[22] Filed: Aug. 16, 1991

[30] Foreign Application Priority Data
Aug. 17, 1990 [DE] Fed. Rep. of Germany ... 9011927[U]
Jul. 16, 1991 [DE] Fed. Rep. of Germany ....... 4123482

[51] Int. Cl.$^5$ .............................................. G01F 1/68
[52] U.S. Cl. .................................. 73/204.26; 338/28; 338/312; 374/208; 374/185
[58] Field of Search ............ 73/202.5, 204.11, 204.22, 73/204.23, 204.25, 204.26; 338/28, 220, 221, 229, 290, 312, 317; 374/54, 138, 185, 208, 209, 210

[56] References Cited

U.S. PATENT DOCUMENTS

| 4,007,435 | 2/1977 | Tien | 338/28 X |
| 4,517,837 | 5/1985 | Oyama et al. | 73/202 |
| 4,549,162 | 10/1985 | Grimm | 338/28 |
| 4,805,452 | 2/1989 | Eiermann et al. | 73/204.26 |
| 5,033,299 | 7/1991 | Tanaka et al. | 73/204.26 |

FOREIGN PATENT DOCUMENTS

| 0354598 | 11/1986 | European Pat. Off. |
| 0353996 | 2/1990 | European Pat. Off. |
| 2914275 | 10/1979 | Fed. Rep. of Germany |
| 3542788 | 6/1987 | Fed. Rep. of Germany |
| 1503872 | 3/1978 | United Kingdom ............... 374/185 |

OTHER PUBLICATIONS

Kirk-Othmer, *Encyclopedia of Chemical Technology* 3rd Ed., vol. 10, pp. 624-627 and Supplement Volume pp. 492-493 (Jul. 1992).

*Primary Examiner*—William A. Cuchlinski, Jr.
*Assistant Examiner*—W. Morris Worth
*Attorney, Agent, or Firm*—Beveridge, DeGrandi, Weilacher & Young

[57] ABSTRACT

A sensor for thermal mass flowmeters is described herein. The sensor includes a plate-shaped, thin-film resistor and a cylindrical holder into which the resistor is fastened. In order to fasten the thin-film resistor in a mechanically stable manner, the end surface of the holder is provided with a pocket hole which closely matches the cross section of the thin-film resistor. The thin-film resistor is suitably inserted into this pocket hole and fastened therein with an adhesive agent.

8 Claims, 3 Drawing Sheets

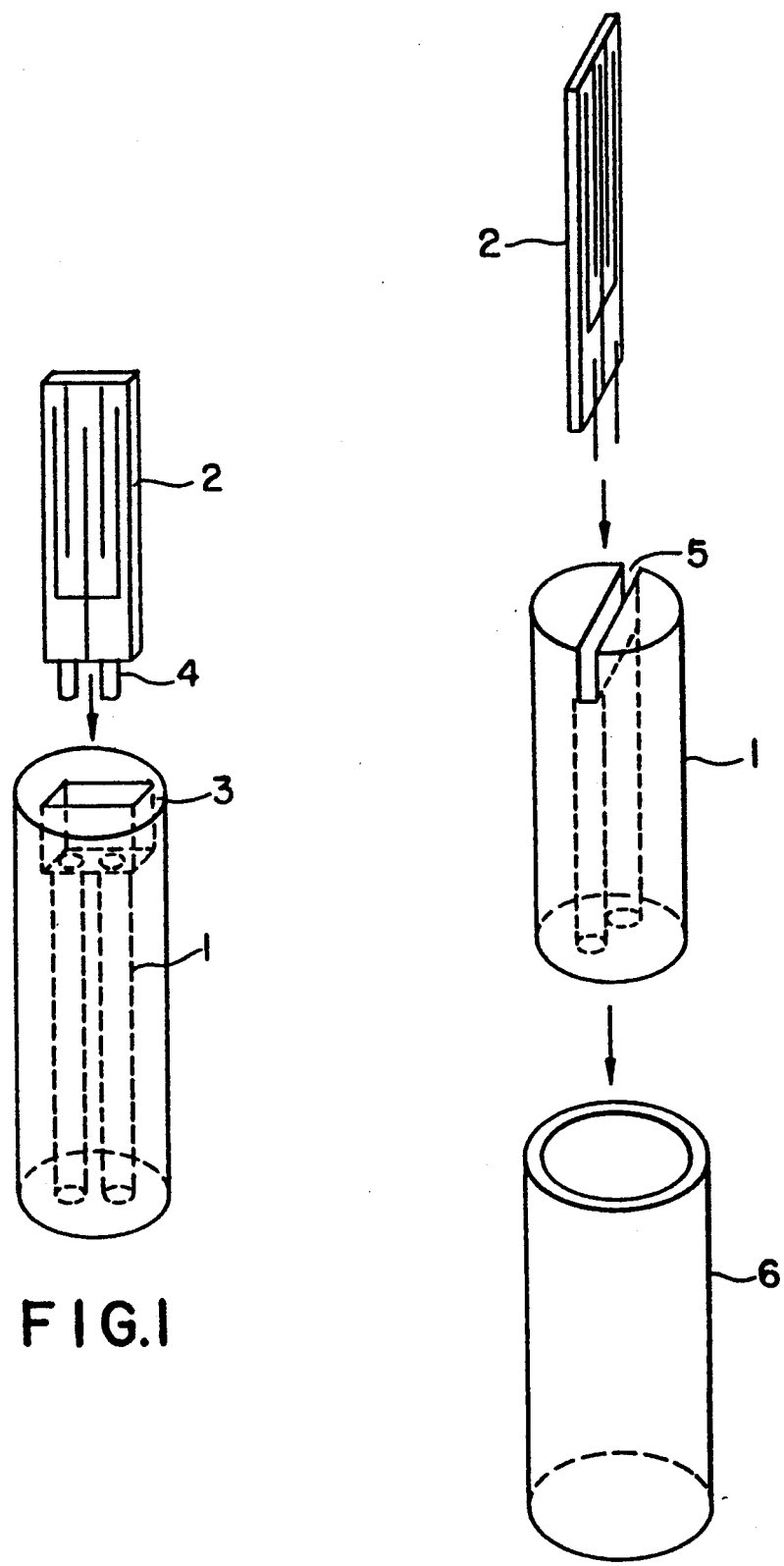

# SENSOR FOR THERMAL MASS FLOWMETERS

BACKGROUND OF THE INVENTION

This invention relates to a sensor for thermal mass flowmeters used to measure thermal effects in liquid or gas streams. The sensor includes a plate-shaped thin-film resistor and a holder in the shape of a cylindrical rod. The cylindrical rod includes an electrically insulating material provided with capillary drillings for the conductors which are connected to the thin-film resistor.

In industrial processing engineering, thermal mass flowmeters operate according to the principle of hot-wire or hot-film anemometers. Such flowmeters are known and are used to a large extent, for example, to measure gas velocities in furnaces, smokestacks, electrostatic precipitators or air ducts. A typical mass flowmeter is described, for example, in German Published Patent Application DE-OS 3,542,788, which is entirely incorporated herein by reference.

In addition, thermal flowmeters and hot-wire or hot-film anemometers are described in Kirk-Othmer, *Encyclopedia of Chemical Technology*, Third Edition, Vol. 10, pages 624-627 and the Supplement Volume, pages 492-493, which are also entirely incorporated herein by reference.

The thin-film resistors used as sensors are provided with a holder which is typically a rod-shaped multi-capillary. The holder also receives the connecting wires of the resistor. The thin-film resistor which includes a ceramic support and a thin metal layer, and optionally a ceramic cover plate, is inserted into a slit in the multi-capillary and fastened with glass solder or a glass frit, as described in DE-OS 3,542,788.

This manner of fastening the resistor into its holder is mechanically unstable. Moreover, with this type of fastening, the glass solder displays a relatively large surface to the environment to be measured. When the sensor is used in an aggressive media or environment, this may result in a rapid decay of the glass solder, and thereby a rapid deterioration of the fastening joint itself.

A further disadvantage of this "massive" fastening type joint is that parasitical heat flows from the heated resistor to the more distant areas of the holder which do not receive good flow contact. Another disadvantage is the relatively high effective heat capacity of the capillary. As a result of these two characteristics, rather long response times occur when changing the medium or the heat resistor temperature, during which times the entire temperature distribution in and around the holder has to be reestablished.

SUMMARY OF THE INVENTION

It is one objective of the present invention to provide a sensor for thermal mass flowmeters with improved stability and response times. These flowmeters include a plate-shaped, thin-film resistor and a holder in the shape of a cylindrical rod. The holder includes an electrically insulating material provided with capillary drillings for the conductors of the resistor, whereby the attachment of the resistor to the holder is mechanically very stable. To provide the stability, the fastener should expose the smallest possible surface toward the medium to be measured. Furthermore, the holder should display improved response times during fluctuating medium temperatures by minimizing the heat capacity and parasitical heat flows.

BRIEF DESCRIPTION OF THE DRAWINGS

The advantageous features of this invention will become more apparent from the following detailed description, taken in conjunction with the attached figures wherein:

FIG. 1 shows a first embodiment of the sensor in accordance with the invention;

FIG. 2 shows another embodiment of the sensor in accordance with the invention;

DETAILED DESCRIPTION OF THE INVENTION

The sensor in accordance with this invention includes one end surface of a rod-shaped holder which is provided with a pocket hole which closely matches the cross-section of the thin-film resistor. One of the narrow sides of the thin-film resistor is inserted into this pocket hole, preferably to the extent of about 10 to 60% of the length of the resistor. The area in the small slit between the pocket hole and the thin-film resistor is filled with an adhesive substance such as a glass solder or glass frit. Such adhesive substances are known to those skilled in the art. This embodiment of the invention is shown in FIG. 1, which will be discussed in more detail below.

The sensor of this invention is used in the conventional manner that other hot film anemometers are used. Such methods of use are well known to those skilled in the art.

In another embodiment of the invention, a holder has a pocket hole which is formed at a front end of a rod-shaped multi-capillary by providing a slit in the multi-capillary, and a tube of an electrically insulating material which tightly encloses the multi-capillary. This embodiment is shown in FIG. 2, which will be discussed in more detail below.

Figure 3A:
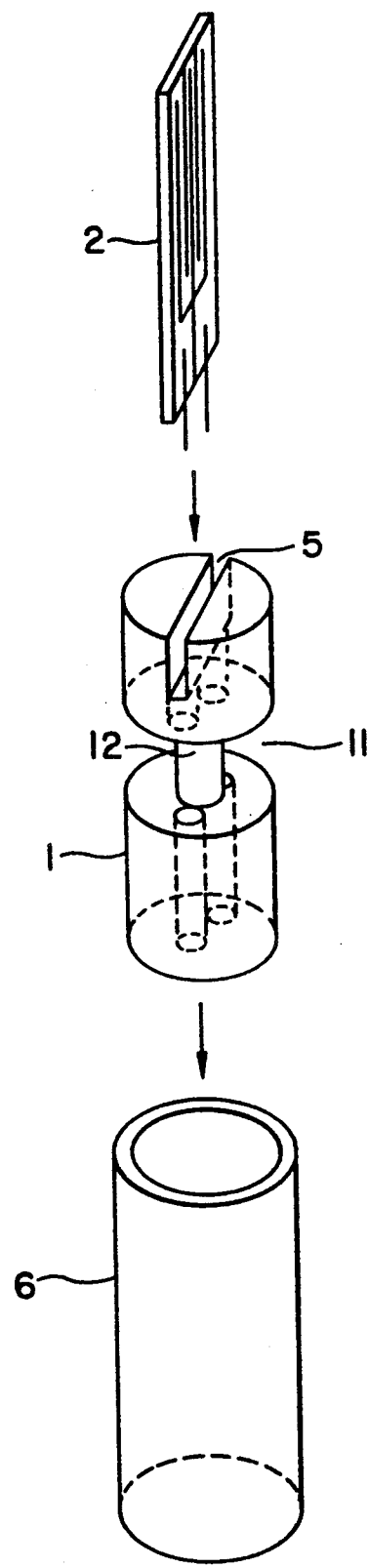
FIG. 3A shows a third embodiment of the sensor in accordance with the invention.

In one preferred embodiment of the invention, the multi-capillary is not shaped as a continuous cylinder, but rather, as shown in FIG. 3A, it is provided with a tapering portion, wherein there is no contact between the jacket tube and the multi-capillary over at least the length of the tapering portion. One advantage of this embodiment is that there is a less effective thermal capacity and reduced parasitic heat dissipation in the holder. Most of the remaining parasitical heat flow is redirected through a short path in areas close to the wall, around which the medium circulates. This sensor responds especially quickly to changes in the medium or the heater temperature, since only the small upper cylinder needs to reach the equilibrium temperature of the medium to be measured, as compared to heating of the entire multi-capillary, as would occur in the embodiments of FIGS. 1 and 2. The tapered portion acts to thermally insulate the lower cylinder from heat transferred to the upper cylinder by the medium being monitored. Since only the small upper cylinder needs to reach the temperature of the medium, smaller heat capacities are involved and the parasitic heat loss is lowered, which thereby corresponds to faster response times. In addition, the remaining parasitic heat which flows to the lower cylinder flows mainly through the thin jacket of tube (6), and thus is strongly coupled to the medium being measured.

The tapered portion may be in the shape of a thin column or board which continues to function as the electrical insulation for the conductor wires.

Figure 3B:
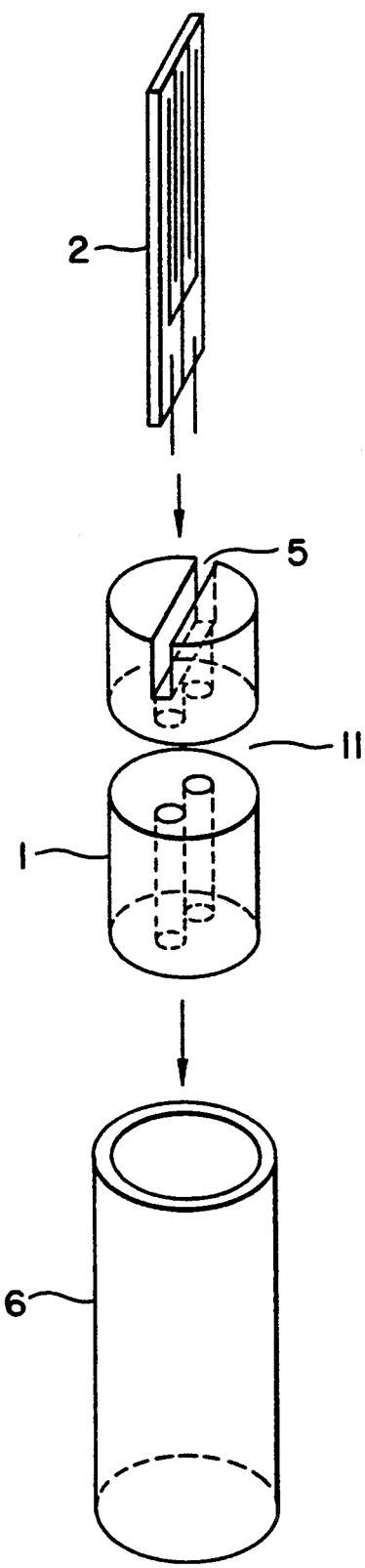
FIG. 3B shows a modified third embodiment of the sensor in accordance with the invention.

Alternatively, it may be advantageous to ensure the electrical insulation of the conductors in another fashion, such as by coating the conductors with electrical insulation or by applying tension to the ends of the conductors to keep them straight so as to maintain a distance between the conductors. As shown in FIG. 3B, then it is possible to separate the capillary entirely, i.e., let the capillary consist of two or more separate parts that are independently connected to the jacket tube with an adhesive substance. In this manner, the gap between the upper and lower cylinders acts to thermally insulate the lower cylinder from heat transferred to the upper cylinder by the medium being monitored. As discussed above with respect to the embodiment of FIG. 3A, this results in smaller heat capacities and lower parasitic heat losses, and consequently, faster response times.

One especially uncomplicated embodiment in accordance with the invention is obtained if the length of the multi-capillary is shorter than the length of the enclosing tube.

The rod-shaped holder includes an electrically insulating material preferably made from ceramic or glass. As an adhesive substance, a glass frit or a glass solder may be used. Such substances are known in the art. If the holder includes the multi-capillary and an enclosing tube, then preferably a thin-walled tube made from a ceramic with the same thermal expansion coefficient as the multi-capillary is used as the enclosing tube.

The sensor holder is normally surrounded by a protective tube, whereby a space remains between the holder and the protective tube. This arrangement has a disadvantage in that the slit may become filled with dirt that is carried along by the medium to be measured. This may result in changing the characteristics of the sensor due to increased heat dissipation. It is therefore advantageous to provide the holder with a closely adjoining protective tube made from a corrosion-resistant material.

The sensor in accordance with some of the various embodiments of the invention is shown in FIGS. 1 to 3. The particular embodiments shown in the figures are intended to be illustrative of the invention, and not limiting to the invention.

In FIG. 1, the cylindrical holder (1) has a pocket hole (3) at one end surface into which a thin-film resistor (2) with its conductors (4) is inserted in a proper manner. The conductors (4) exit the holder through holes on the opposite end surface of the holder, the holes being shown as phantom lines in FIG. 1. The narrow slit or volume remaining between the thin-film resistor (2) and the inner side or sides of the pocket hole (3) is filled with a glass frit or glass solder.

FIG. 2 shows another embodiment of the invention. In this embodiment, a multi-capillary (1) is provided with a slit (5) at one end. In this slit (5), a thin-film resistor (2) is fastened. A thin-walled ceramic tube (6) is then positioned upside down over the multi-capillary (1), such that a pocket hole is formed by the slit (5) and the walls of the ceramic tube (6).

FIG. 3A shows another embodiment of the holder according to the invention. The multi-capillary (1) here has a tapered portion (11) which includes a thin column (12) and which reduces the thermal capacity of the holder and directs parasitical heat flow above the thin column (12) and the cross-section of the jacket tube. Due to the small cross sections, the heat conduction over the column and the jacket tube is less than what would be observed with a massive design of the holder. As a result thereof, a dramatic improvement in the response time for a fluctuating medium temperature is observed. In the embodiment shown in FIG. 3A, column (12) then continues to provide the electrical insulation between the conductors (4) of the thin-film resistor (2) by separating the conductors (4). The conductors may be coated with an insulating material to provide additional electrical insulation.

Alternatively, as shown in FIG. 3B, the column portion (12) can be omitted such that two separate parts of the multi-capillary (1) are independently connected in the jacket tube with an adhesive, thereby leaving a gap or interruption between the two parts. In this embodiment, another way of insulating the electrical conductors (4) from one another must be provided, such as by using tension on the conductors (4) to maintain their electrical separation, or by coating the conductors with an electrical insulating material.

While the invention has been described in conjunction with particular preferred embodiments, various modifications and changes may be made to the sensor by those skilled in the art, without departing from the invention as set forth in the following claims.

The priority applications, German Utility Model Application No. G 90 11 927.4 and German Patent Application No. P 41 23 482.0, filed in Germany on Aug. 17, 1990 and Jul. 16, 1991, respectively, are relied on and entirely incorporated herein by reference.

We claim:

1. A sensor for a thermal mass flow meter, said sensor comprising:

a plate-shaped thin-film resistor, a holder in the shape of a cylindrical rod, and a tube tightly enclosing the cylindrical rod, wherein the holder includes an electrically insulating material and is provided with capillary drillings for receiving conductors connected to the thin-film resistor;

wherein a first end of the holder defines a pocket hole which is adapted to receive the thin film resistor;

said pocket hole being defined by a slit extending across said first end of the holder and by the enclosing tube;

wherein a narrow end portion of the thin-film resistor is inserted into the pocket hole, whereby approximately 10 to 60% of the length of the thin-film resistor is received therein;

wherein an area between a wall of the pocket hole and the received end portion of the thin-film resistor is filled with an adhesive substance; and wherein said holder in the shape of the cylindrical rod further includes a tapered portion which prevents contact between the cylindrical rod and the tube enclosing the rod over at least the length of the tapered portion.

2. A sensor according to claim 15, wherein the electrically insulating material of the holder is chosen from the group of ceramic or glass.

3. A sensor according to claim 1, wherein the adhesive substance is chosen from the group of glass frit or glass solder.

4. A sensor according to claim 2, wherein the adhesive substance is chosen from the group of glass frit or glass solder.

5. A sensor for a thermal mass flow meter, said sensor comprising:
a plate-shaped thin-film resistor, a holder in the shape of a cylindrical rod, and a tube tightly enclosing the cylindrical rod, wherein the holder includes an electrically insulating material and is provided with capillary drillings for receiving conductors connected to the thin-film resistor;
wherein a first end of the holder defines a pocket hole which is adapted to receive the thin film resistor;
said pocket hole being defined by a slit extending across said first end of the holder and by the enclosing tube;
wherein a narrow end portion of the thin-film resistor is inserted into the pocket hole, whereby approximately 10 to 60% of the length of the thin-film resistor is received therein;
wherein an area between a wall of the pocket hole and the received end portion of the thin-film resistor is filled with an adhesive substance; and
wherein said holder in the shape of the cylindrical rod includes two separate cylindrical rod portions separated by a gap.

6. A sensor according to claim 5, wherein the electrically insulating material of the holder is chosen from the group of ceramic or glass.

7. A sensor according to claim 5, wherein the adhesive substance is chosen from the group of glass frit or glass solder.

8. A sensor according to claim 6, wherein the adhesive substance is chosen from the group of glass frit or glass solder.

* * * * *